United States Patent
Sun et al.

(10) Patent No.: US 10,388,276 B2
(45) Date of Patent: Aug. 20, 2019

(54) METHOD AND DEVICE FOR WAKING UP VIA SPEECH BASED ON ARTIFICIAL INTELLIGENCE AND COMPUTER DEVICE

(71) Applicant: BAIDU ONLINE NETWORK TECHNOLOGY (BEIJING) CO., LTD., Beijing (CN)

(72) Inventors: Jue Sun, Beijing (CN); Mingming Chen, Beijing (CN); Xiangang Li, Beijing (CN)

(73) Assignee: BAIDU ONLINE NETWORK TECHNOLOGY (BEIJING) CO., LTD., Beijing (CN)

(*) Notice: Subject to any disclaimer, the term of this patent is extended or adjusted under 35 U.S.C. 154(b) by 0 days.

(21) Appl. No.: 15/854,926

(22) Filed: Dec. 27, 2017

(65) Prior Publication Data
US 2018/0336886 A1 Nov. 22, 2018

(30) Foreign Application Priority Data
May 16, 2017 (CN) .......................... 2017 1 0343874

(51) Int. Cl.
*G10L 15/16* (2006.01)
*G10L 15/02* (2006.01)
(Continued)

(52) U.S. Cl.
CPC .............. *G10L 15/16* (2013.01); *G06N 3/04* (2013.01); *G06N 3/0454* (2013.01); *G06N 3/08* (2013.01);
(Continued)

(58) Field of Classification Search
CPC ................ G10L 15/063; G10L 15/144; G10L 2015/025; G10L 2015/088; H04N 21/41407; G06F 3/167; G06K 9/00536
See application file for complete search history.

(56) References Cited

U.S. PATENT DOCUMENTS 9,443,517 B1 * 9/2016 Foerster .................. G10L 15/08
2004/0215458 A1 * 10/2004 Kobayashi .............. G10L 15/06
704/251

(Continued)

FOREIGN PATENT DOCUMENTS

CN  105632486 A * 6/2016
CN  106098059 A * 11/2016
CN  106611597 A * 5/2017 ........... G10L 15/187

*Primary Examiner* — Yogeshkumar Patel
(74) *Attorney, Agent, or Firm* — Hodgson Russ LLP

(57) ABSTRACT

Embodiments of the present disclosure provide a method and a device for waking up via a speech based on AI and a computer device. The method includes the followings. A windowing and framing operation is performed on an online recorded speech, to obtain at least one speech frame. A feature extraction is performed on the at least one speech frame, to obtain speech features. A calculation is performed on a static speech feature contained in the at least one speech frame through a speech wake-up model based on convolutional neural network, to obtain a first posteriori probability matched with a category of non-wake-up words and a second posteriori probability matched with a category of wake-up words. It is determined that a wake-up word is contained in the online recorded speech, when the second posteriori probability is greater than or equal to a preset threshold.

20 Claims, 7 Drawing Sheets

(51) Int. Cl.
- *G10L 15/14* (2006.01)
- *G10L 15/06* (2013.01)
- *G06N 3/04* (2006.01)
- *G06N 3/08* (2006.01)
- *G10L 15/22* (2006.01)
- *G10L 15/08* (2006.01)

(52) U.S. Cl.
CPC ............ *G10L 15/02* (2013.01); *G10L 15/063* (2013.01); *G10L 15/14* (2013.01); *G10L 15/22* (2013.01); *G10L 2015/088* (2013.01)

(56) References Cited

U.S. PATENT DOCUMENTS

| | | | |
|---|---|---|---|
| 2006/0271368 A1* | 11/2006 | Carmiel | G10L 15/26 704/275 |
| 2014/0226838 A1* | 8/2014 | Wingate | G10L 21/0272 381/111 |
| 2015/0127594 A1* | 5/2015 | Parada San Martin | G06N 3/0454 706/16 |
| 2015/0340032 A1* | 11/2015 | Gruenstein | G10L 15/16 704/232 |
| 2016/0092766 A1* | 3/2016 | Sainath | G10L 25/30 706/20 |
| 2016/0148616 A1* | 5/2016 | Takayanagi | G10L 15/32 704/235 |
| 2016/0180214 A1* | 6/2016 | Kanevsky | G06N 3/0454 706/21 |
| 2016/0189706 A1* | 6/2016 | Zopf | G10L 15/063 713/320 |
| 2016/0217367 A1* | 7/2016 | Moreno | G10L 15/16 |
| 2018/0068656 A1* | 3/2018 | Lehman | G10L 15/1815 |
| 2018/0151183 A1* | 5/2018 | Li | G10L 15/02 |
| 2018/0158449 A1* | 6/2018 | Tang | G10L 15/187 |
| 2018/0182377 A1* | 6/2018 | Li | G06K 9/6274 |
| 2018/0277096 A1* | 9/2018 | Li | G10L 15/02 |
| 2018/0277097 A1* | 9/2018 | Li | G10L 15/02 |

* cited by examiner

METHOD AND DEVICE FOR WAKING UP VIA SPEECH BASED ON ARTIFICIAL INTELLIGENCE AND COMPUTER DEVICE

CROSS-REFERENCE TO RELATED APPLICATIONS

This application is based on and claims priority to Chinese Patent Application No. 201710343874.0, filed on May 16, 2017, the entire contents of which are incorporated herein by reference.

TECHNICAL FIELD

The present disclosure relates to the field of speech recognition technology, and more particularly, to a method and a device for waking up via a speech based on artificial intelligence (hereinafter denoted as AI for short) and a computer device.

BACKGROUND

In a smart home or a speech interaction system, the speech wake-up technology is widely used. However, an effect and a computation amount of the speech wake-up greatly reduce practical application experience and improve requirements for device hardware. For example, if an error wake-up rate of the speech wake-up technology is greater than a threshold in practice, such as one error wake-up per three hours, such frequency may cause user's disgust. On another hand, if the computation amount exceeds a computation power of some low-end chips, a usage of the speech wake-up technology for many products may be restricted.

In the related art, the speech wake-up technology is to use a keyword-spotting method. By designing a small Deep Neural Network (hereinafter denoted as DNN for short) model and by constructing a clever little decoding network, with a few tricks of keywords retrieve, speech wake-up functions are achieved.

However, the above speech wake-up technology with the keyword-spotting method has a large amount of model parameters, a design of fillers needs to be changed for a different wake-up word (also called as wakeword), and corresponding decoding parameters and tricks retrieved need to be adjusted. It is hard to have a unified algorithm to ensure that an effect of each wake-up word remains at a stable level. After the filler has been set, a misunderstanding level of the wake-up word is fixed and the wake-up word that is misunderstood cannot be adjusted and learnt flexibly and easily.

SUMMARY

Embodiments of the present disclosure provide a method for waking up via a speech based on AI. The method includes: performing a windowing and framing operation on an online recorded speech, to obtain at least one speech frame; performing a feature extraction on the at least one speech frame, to obtain speech features; performing a calculation on a static speech feature contained in the at least one speech frame through a speech wake-up model based on convolutional neural network, to obtain a first posteriori probability of the static speech feature contained in the at least one speech frame and matched with a category of non-wake-up words and a second posteriori probability of the static speech feature contained in the at least one speech frame and matched with a category of wake-up words; and determining that a wake-up word is contained in the online recorded speech, when the second posteriori probability of the static speech feature contained in the at least one speech frame and matched with the category of wake-up words is greater than or equal to a preset threshold.

Embodiments of the present disclosure provide a computer device. The computer device includes one or more processors; a storage device, configured to store one or more programs; in which when the one or more programs are executed by the one or more processors, the one or more processors execute the above-mentioned method.

Embodiments of the present disclosure provide a computer readable medium stored computer programs thereon, in which when the computer programs are executed by a processor, the above-mentioned method is executed.

Additional aspects and advantages of embodiments of the present disclosure will be given in part in the following descriptions, become apparent in part from the following descriptions, or be learned from the practice of the embodiments of the present disclosure.

BRIEF DESCRIPTION OF THE DRAWINGS

The above and/or additional aspects and advantages of embodiments of the present disclosure will become apparent and more readily appreciated from the following descriptions made with reference to the drawings, in which.

DETAILED DESCRIPTION

Figure 1:
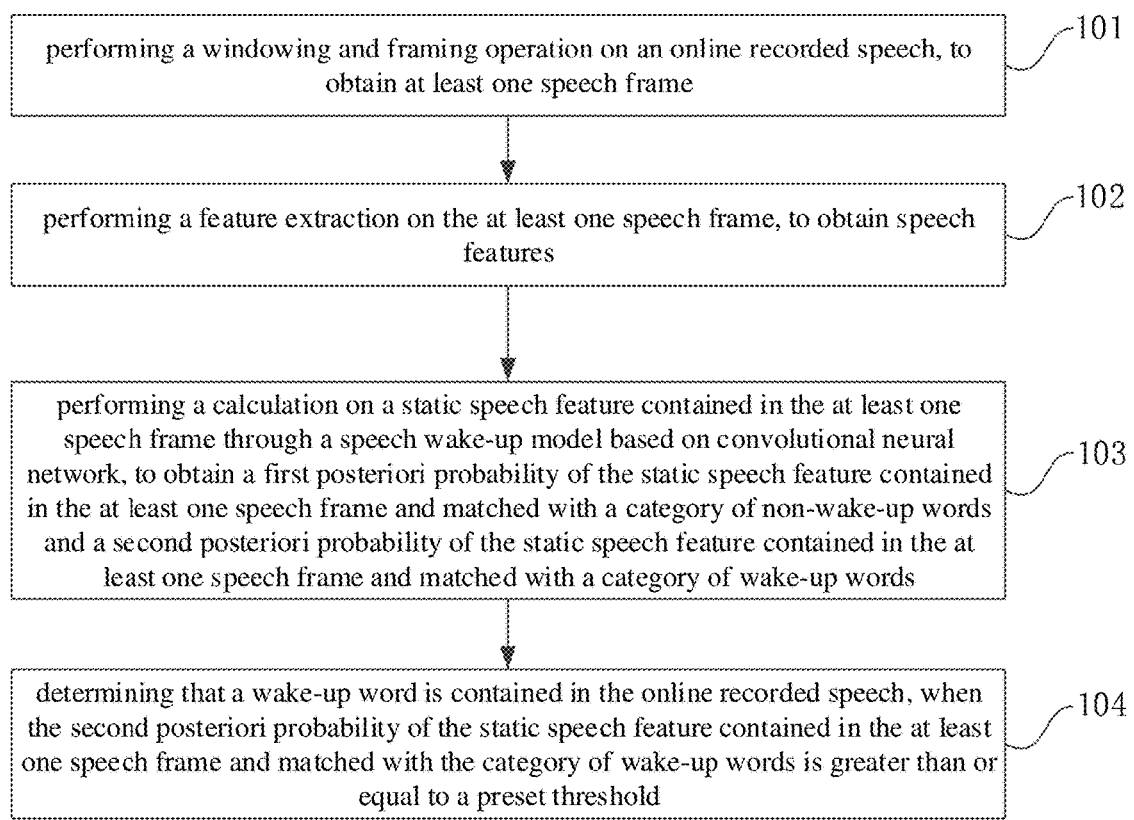
FIG. 1 is a flow chart illustrating a method for waking up via a speech based on AI according to an embodiment of the present disclosure.

Embodiments of the present disclosure will be described in detail and examples of embodiments are illustrated in the drawings. The same or similar elements and the elements having same or similar functions are denoted by like reference numerals throughout the descriptions. Embodiments described herein with reference to drawings are explanatory, serve to explain the present disclosure, and are not construed to limit embodiments of the present disclosure. Instead, the embodiments of the present disclosure comprise all the variants, modifications and their equivalents within the spirit and scope of the present disclosure as defined by the appended claims.

AI is a new technical science studying and developing theories, methods, techniques and application systems for simulating, extending and expanding human intelligence. AI is a branch of computer science, which attempts to know the essence of intelligence and to produce an intelligent robot capable of acting as a human. The researches in this field include robots, speech recognition, image recognition, natural language processing and expert systems, etc. The speech recognition is a most important aspect of AI.

FIG. 1 is a flow chart illustrating a method for waking up via a speech based on AI according to an embodiment of the present disclosure. As illustrated in FIG. 1, the above method for waking up via a speech based on AI includes the followings.

In block 101, a windowing and framing operation is performed on an online recorded speech, to obtain at least one speech frame.

In detail, when a feature extraction is to be performed on the online recorded speech, it needs to perform the windowing and framing operation on the online recorded speech firstly. Taking an example for illustration, a window length of the windowing and framing operation is for example 25 milliseconds and a frame shift between adjacent frames is for example 10 milliseconds. In other words, the online recorded speech is divided every ten milliseconds to obtain the at least one speech frame.

In block 102, the feature extraction is performed on the at least one speech frame, to obtain speech features.

In detail, after the windowing and framing operation is performed on the online recorded speech, the feature extraction may be performed on the at least one speech frame, to obtain the speech features. In embodiments, the above-mentioned speech feature may be a filter bank (hereinafter denoted as fbank for short) feature, or may be another speech feature, such as a Mel Frequency Cepstrum Coefficient (hereinafter denoted as MFCC for short) feature. The speech features is not limited in embodiments. The fbank feature being the above-mentioned speech feature in embodiments is taken as an example for illustration.

In block 103, a calculation is performed on a static speech feature contained in the at least one speech frame through a speech wake-up model based on convolutional neural network (hereinafter denoted as CNN for short), to obtain a first posteriori probability of the static speech feature contained in the at least one speech frame and matched with a category of non-wake-up words and a second posteriori probability of the static speech feature contained in the at least one speech frame and matched with a category of wake-up words.

In embodiments, the static speech feature contained in the at least one speech frame includes: a static speech feature contained in a current speech frame, a static speech feature contained in a first number of speech frames ahead of the current speech frame, and a static speech feature contained in a second number of speech frames behind of the current speech frame.

The first number and the second number may be set according to system performances and/or practical requirements when the first number and the second number are implemented. The first number and the second number are not limited in embodiments. For example, the first number may be set as 23 and the second number may be set as 8.

In detail, the above speech wake-up model based on CNN may be a CNN model with 6 layers. In order to improve a speech wake-up performance, a static fbank feature contained in a plurality of continuous speech frames may be used as an input of the above speech wake-up model based on CNN. In embodiments, the static fbank feature contained in the current speech frame, the static fbank feature contained in 23 speech frames ahead of the current speech frame and the static fbank feature contained in 8 speech frames behind of the current speech frame are used as the input of the speech wake-up model based on CNN.

In embodiments, an output of the speech wake-up model based on CNN may at least include two nodes. One of the two nodes is the category of non-wake-up words (i.e. a filler category) and another one is the category of wake-up words. For those inputted static speech feature contained in the above speech frame, after the calculation performed through the speech wake-up model based on CNN, the first posteriori probability of the static speech feature contained in the above speech frames and matched with the category of non-wake-up words and the second posteriori probability of the static speech feature contained in the above speech frames and matched with the category of wake-up words may be outputted.

In particular implementations, the above-mentioned category of wake-up words may be further divided into two subcategories. In other words, the output of the speech wake-up model based on CNN may include three nodes. The three nodes include the category of non-wake-up words (i.e. the filler category) and two subcategories of wake-up words. The number of the categories included in the output of the speech wake-up model based on CNN is not limited in embodiments.

In block 104, when the second posteriori probability of the static speech feature contained in the at least one speech frame and matched with the category of wake-up words is greater than or equal to a preset threshold, it is determined that a wake-up word is contained in the online recorded speech.

When the preset threshold is implemented, the preset threshold may be set according to system performances and/or practical requirements. The preset threshold is not limited in embodiments. For example, the above preset threshold may be set as 75%.

In the above method for waking up via a speech based on AI, after the at least one speech frame is obtained by performing the windowing and framing operation on the online recorded speech, the feature extraction is performed on the at least one speech frame to obtain the speech features. The calculation is performed on the static speech feature contained in the at least one speech frame through the speech wake-up model based on convolutional neural network, to obtain the first posteriori probability of the static speech feature contained in the at least one speech frame and matched with the category of non-wake-up words and the second posteriori probability of the static speech feature contained in the at least one speech frame and matched with the category of wake-up words. When the second posteriori probability of the static speech feature contained in the at least one speech frame and matched with the category of wake-up words is greater than or equal to the preset threshold, it is determined that the wake-up word is contained in the online recorded speech. There are less inputted features to the above speech wake-up model based on convolutional neural network, thereby achieving to reduce the computation amount. Furthermore, the method may further reduce the computation amount by employing a posteriori probability strategy. The method may better distinguish the wake-up word from the non-wake-up word, so as to improve the speech wake-up effect. Moreover, the method does not need to select a different non-wake-up word for each wake-up word, thereby improving a generality of the method.

Figure 2:
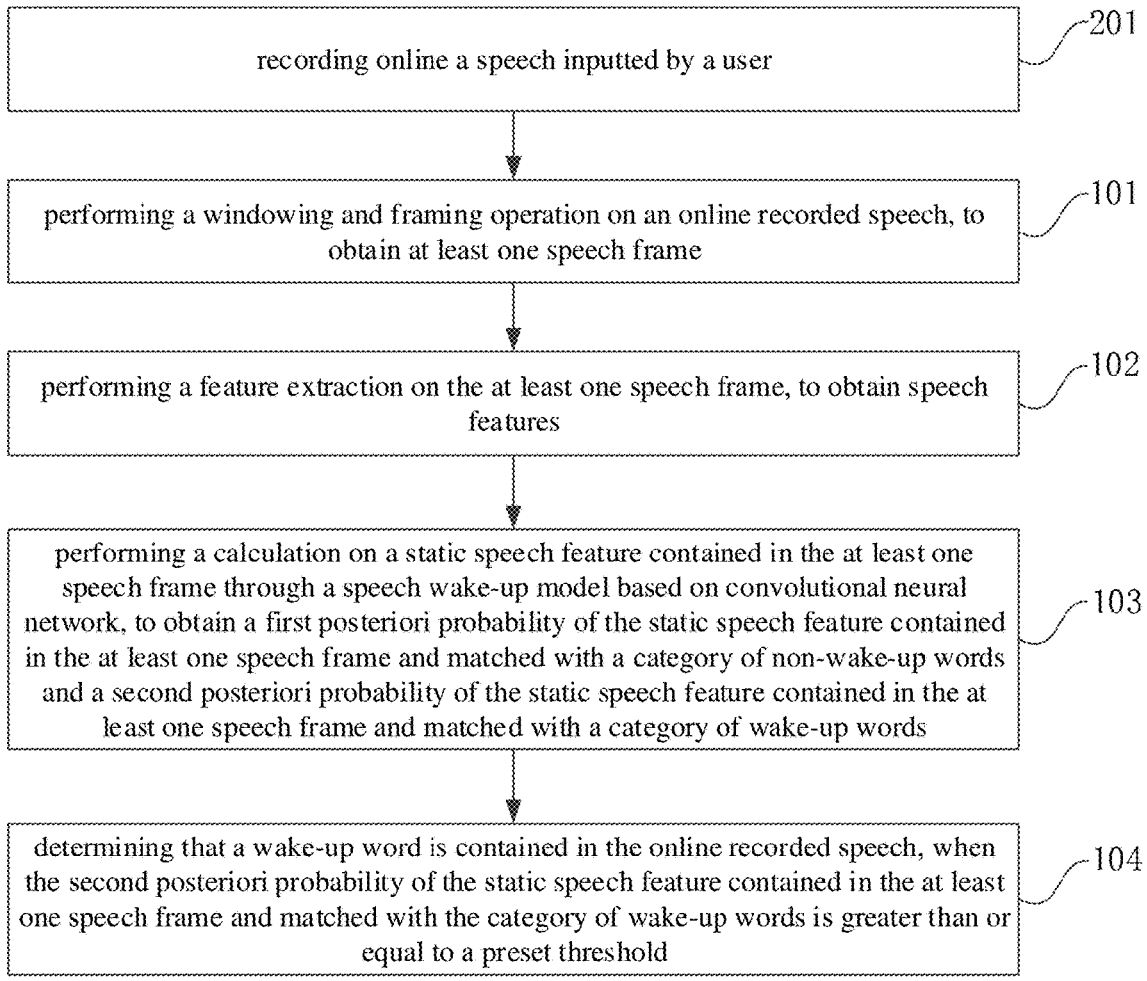
FIG. 2 is a flow chart illustrating a method for waking up via a speech based on AI according to another embodiment of the present disclosure.

FIG. 2 is a flow chart illustrating a method for waking up via a speech based on AI according to another embodiment of the present disclosure. As illustrated in FIG. 2, before the block 101, the method for waking up via a speech may further include the followings.

In block 201, a speech inputted by a user is online recorded.

In embodiments, for a device having speech wake-up functions, a recording module of the device keeps recording outside sounds online, such that the speech inputted by the user is recorded when the speech is inputted by the user, so as to trigger a subsequent progress.

Figure 3:
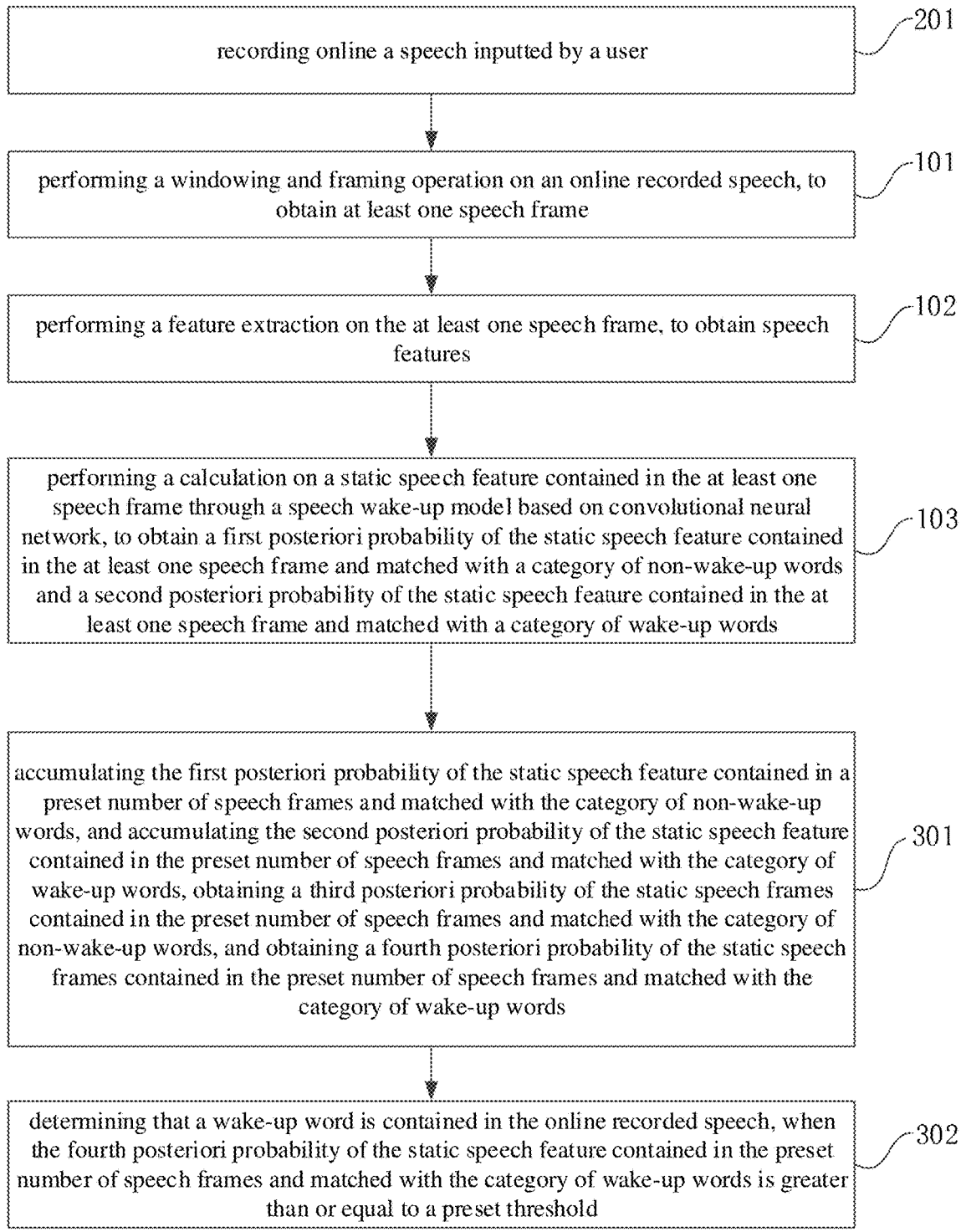
FIG. 3 is a flow chart illustrating a method for waking up via a speech based on AI according to still another embodiment of the present disclosure.

FIG. 3 is flow chart illustrating a method for waking up via a speech based on AI according to still another embodiment of the present disclosure. As illustrated in FIG. 3, after the block 103, the method for waking up via a speech may further include the followings.

In block 301, the first posteriori probability of the static speech feature contained in a preset number of speech frames and matched with the category of non-wake-up words is accumulated, and the second posteriori probability of the static speech feature contained in the preset number of speech frames and matched with the category of wake-up words is accumulated. A third posteriori probability of the static speech frames contained in the preset number of speech frames and matched with the category of non-wake-up words is obtained, and a fourth posteriori probability of the static speech frames contained in the preset number of speech frames and matched with the category of wake-up words is obtained.

The second posteriori probability of the static speech feature contained in the at least one speech frame and matched with the category of wake-up words being greater than or equal to the preset threshold in the block 104 may be the fourth posteriori probability of the static speech frames contained in the preset number of speech frames and matched with the category of wake-up words being greater than or equal to the preset threshold.

In other words, the block 104 may include the followings.

In block 302, when the fourth posteriori probability of the static speech frames contained in the preset number of speech frames and matched with the category of wake-up words is greater than or equal to the preset threshold, it is determined that the wake-up word is contained in the online recorded speech.

That is to say, in embodiments, when the wake-up word is retrieved, a smooth strategy with a fixed window length is employed to accumulate the first posteriori probability of the static speech feature contained in the preset number of speech frames and matched with the category of non-wake-up words, and to accumulate the second posteriori probability of the static speech feature contained in the preset number of speech frames and matched with the category of wake-up words. When the fourth posteriori probability of the static speech frames contained in the preset number of speech frames and matched with the category of wake-up words is greater than or equal to the preset threshold, it is determined that the wake-up word is retrieved. That is, the wake-up word is contained in the online recorded speech.

The above preset number may be set according to system performances and/or practical requirements when being implemented, which is not limited in embodiments.

Figure 4:
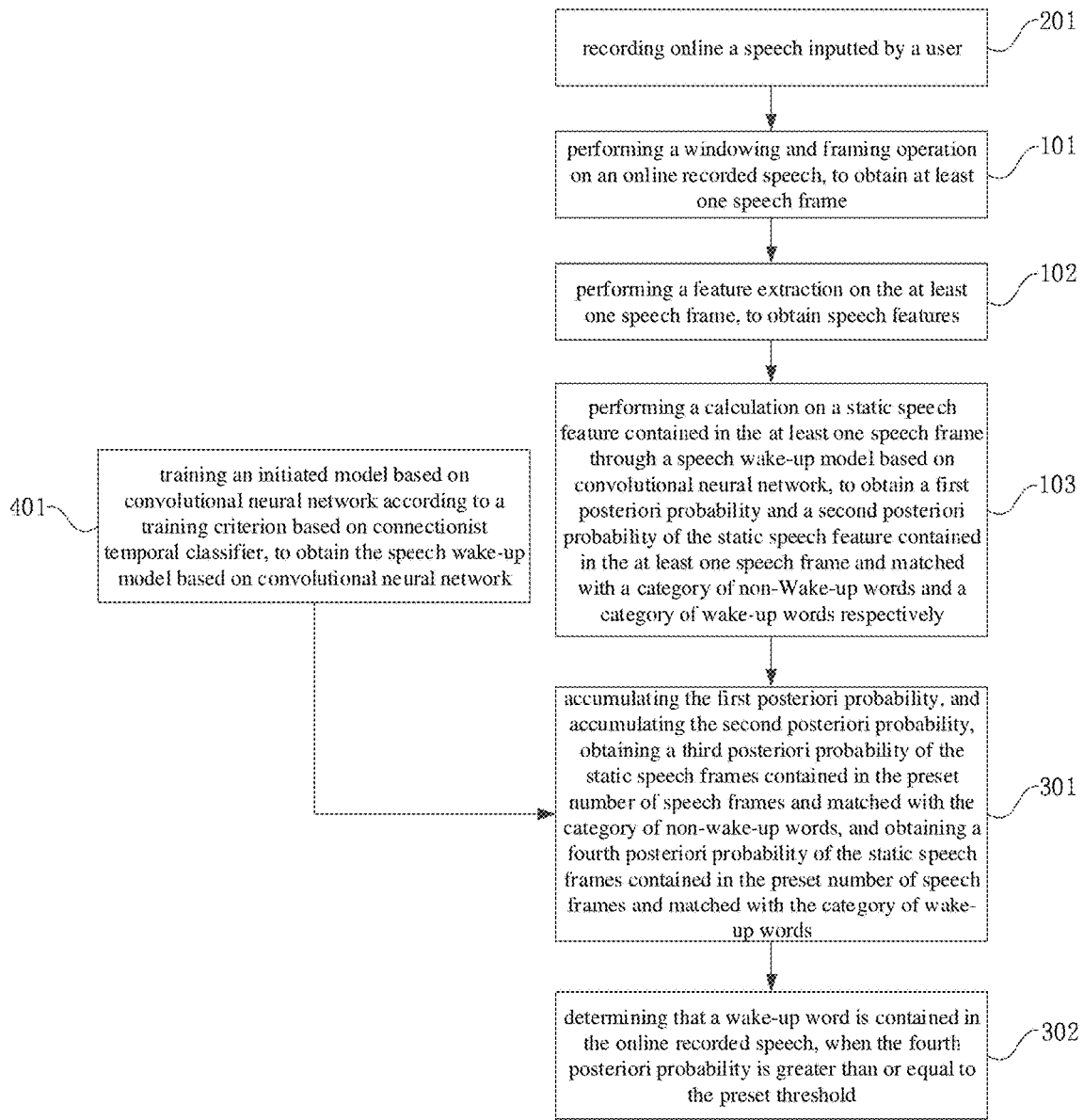
FIG. 4 is a flow chart illustrating a method for waking up via a speech based on AI according to yet another embodiment of the present disclosure.

FIG. 4 is a flow chart illustrating a method for waking up via a speech based on AI according to yet another embodiment of the present disclosure. As illustrated in FIG. 4, before the block 103, the method for waking up via a speech further includes the followings.

In block 401, an initiated model based on CNN is trained according to a training criterion based on connectionist temporal classifier (hereafter denoted as CTC for short), to obtain the above-mentioned speech wake-up model based on CNN.

In embodiments, the training criterion for training the CNN based model with six layers is changed from Cross Entropy to CTC. By training the initiated model based on CNN with six layers according to the training criterion based on CTC, the above-mentioned speech wake-up model based on CNN may be obtained.

Figure 5:
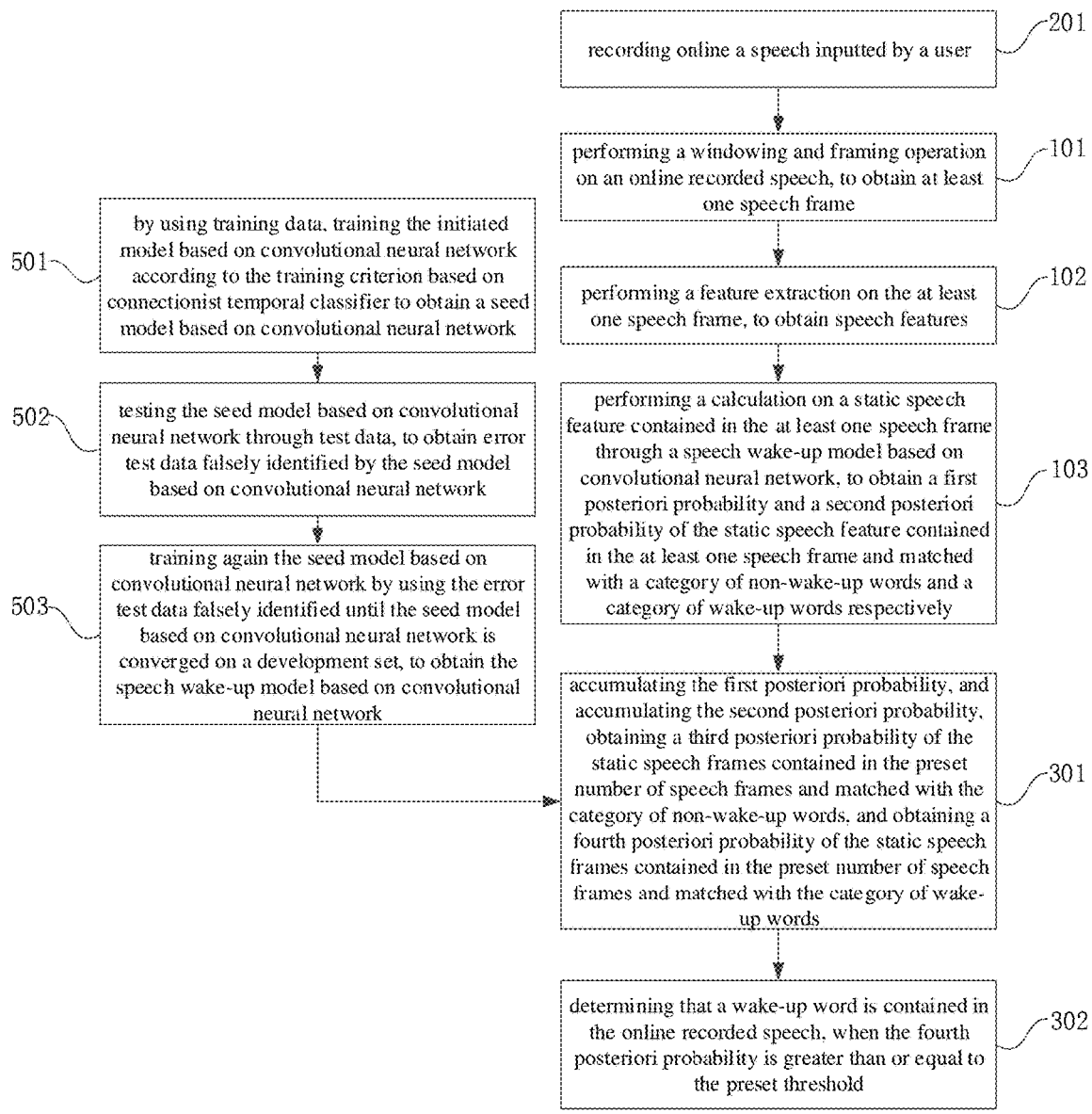
FIG. 5 is a flow chart illustrating a method for waking up via a speech based on AI according to yet another embodiment of the present disclosure.

FIG. 5 is a flow chart illustrating a method for waking up via a speech based on AI according to yet another embodiment of the present disclosure. As illustrated in FIG. 5, in embodiments illustrated as FIG. 4, the block 401 may include the followings.

In block 501, by using training data, the initiated model based on CNN is trained according to the training criterion based on CTC, to obtain a seed model based on CNN.

In block 502, the seed model based on CNN is tested through test data, to obtain error test data falsely identified by the seed model based on CNN.

In block 503, the seed model based on CNN is trained again using the error test data falsely identified until the seed model based on CNN is converged on a development set, to obtain the speech wake-up model based on CNN.

In detail, training again the seed model based on CNN by using the error test data falsely identified may be represented as followings. The error test data falsely identified by the seed model based on CNN is added to the training data mentioned in the block 501. The seed model based on CNN may be trained again by using the training data including the error test data. The blocks 502 and 503 repeat until the seed model based on CNN is converged on the development set, so as to obtain the above-mentioned speech wake-up model based on CNN.

The above development set is a data set different either from the training data mentioned in block 501 or from the test data mentioned in block 502. The above development set is configured to monitor a wake-up performance of the seed model based on CNN trained, to obtain a final speech wake-up model based on CNN. The seed model based on CNN being converged on the development set means that the wake-up performance of the seed model based on CNN cannot increase on the development set.

In other words, after the seed model based on CNN is trained again by using the training data including the error test data falsely identified by the seed model based on CNN, the wake-up performance of the seed model based on CNN obtained in every training cycle is monitored on the development set. In general, the wake-up performance of the seed model based on CNN decreases on the development set firstly. After a plurality of training cycles, the wake-up performance of the seed model based on CNN may gradually increase on the development set, until the wake-up performance of the seed model based on CNN cannot increase on the development set. Then, it may be determined that the seed model based on CNN is converged on the development set and the seed model based on CNN acquired is the final speech wake-up model based on CNN.

With the method for waking up via a speech based on AI provided in embodiments of the present disclosure, by employing a CNN-CTC technical solution, the node number of an output lay of the speech wake-up model based on CNN may be greatly reduced, thereby efficiently reducing an amount of parameters of the speech wake-up model based on CNN and achieving to reduce a computation amount. By employing the smooth posteriori probability strategy, the computation amount may be further reduced. Furthermore, the category of non-wake-up words (i.e. the filler category) is used in the method provided in embodiments of the present disclosure, a training flexibility is improved, such that the method is very generally useable, and it does not need to select a different filler for each wake-up word. With the speech wake-up model based on CNN in the method provided in embodiments of the present disclosure, the speech wake-up effect may be improved better by self-learning. Furthermore, the output layer of the speech wake-up model based on CNN is simple, and the speech wake-up model based on CNN has a clean target. Moreover, the speech wake-up model based on CNN has a good capacity of distinguishing the wake-up words from the non-wake-up words, which may further improve the speech wake-up effect.

Figure 6:
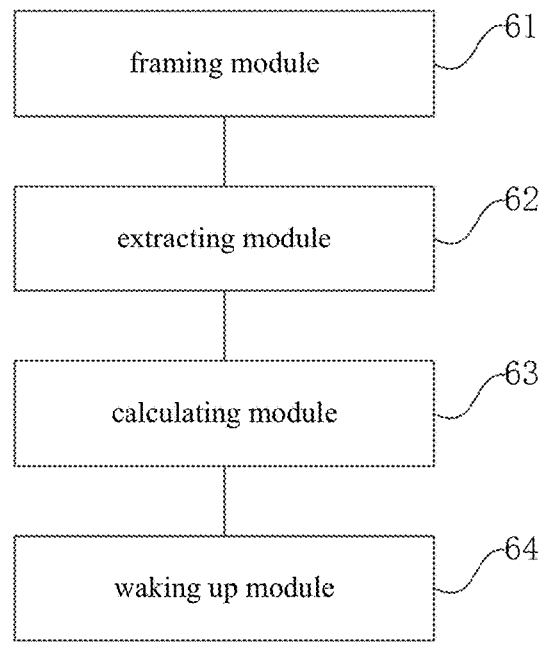
FIG. 6 is a block diagram illustrating a device for waking up via a speech based on AI according to an embodiment of the present disclosure.

FIG. 6 is a block diagram illustrating a device for waking up via a speech based on AI according to an embodiment of the present disclosure. The device for waking up via a speech based on AI in embodiments of the present disclosure may be used as a device having speech wake-up functions for achieving the method for waking up via a speech based on AI provided in embodiments of the present disclosure. As illustrated in FIG. 6, the device for waking up via a speech based on AI may include a framing module 61, an extracting module 62, a calculating module 63 and a waking up module 64.

The framing module 61 is configured to perform a windowing and framing operation on an online recorded speech, to obtain at least one speech frame. In detail, when a feature extraction is to be performed on the online recorded speech, it needs to perform, via the framing module 61, the windowing and framing operation on the online recorded speech firstly. Taking an example for illustration, a window length of the windowing and framing operation is for example 25 milliseconds and a frame shift between adjacent frames is for example 10 milliseconds. In other words, the online recorded speech is divided every ten milliseconds to obtain at least one speech frame.

The extracting module 62 is configured to perform a feature extraction on the at least one speech frame obtained by the framing module 61, to obtain speech features. In detail, after the windowing and framing operation is performed via the framing module 61 on the online recorded speech, the feature extraction may be performed via the extracting module 62 on the at least one speech frame, to obtain the speech features. In embodiments, the above-mentioned speech feature may be a filter bank (hereinafter denoted as thank for short) feature, or may be another speech feature, such as a Mel Frequency Cepstrum Coefficient (hereinafter denoted as MFCC for short) feature. The speech features is not limited in embodiments. The thank feature being the above-mentioned speech feature in embodiments is taken as an example for illustration.

The calculating module 63 is configured to perform a calculation on a static speech feature contained in the at least one speech frame through a speech wake-up model based on convolutional neural network, to obtain a first posteriori probability of the static speech feature contained in the at least one speech frame and matched with a category of non-wake-up words and a second posteriori probability of the static speech feature contained in the at least one speech frame and matched with a category of wake-up words. In embodiments, the static speech feature contained in the at least one speech frame includes: a static speech feature contained in a current speech frame, a static speech feature contained in a first number of speech frames ahead of the current speech frame, and a static speech feature contained in a second number of speech frames behind of the current speech frame.

The first number and the second number may be set according to system performances and/or practical requirements when the first number and the second number are implemented. The first number and the second number are not limited in embodiments. For example, the first number may be set as 23 and the second number may be set as 8.

In detail, the above speech wake-up model based on CNN may be a CNN model with 6 layers. In order to improve a speech wake-up performance, a static thank feature contained in a plurality of continuous speech frames may be used as an input of the above speech wake-up model based on CNN. In embodiments, the static thank feature contained in the current speech frame, the static thank feature contained in 23 speech frames ahead of the current speech frame and the static thank feature contained in 8 speech frames behind of the current speech frame are used as the input of the speech wake-up model based on CNN.

In embodiments, an output of the speech wake-up model based on CNN may at least include two nodes. One of the two nodes is the category of non-wake-up words (i.e. a filler category) and another one is the category of wake-up words. For those inputted static speech feature contained in the above speech frame, after the calculation performed through the speech wake-up model based on CNN, the first posteriori probability of the static speech feature contained in the above speech frames and matched with the category of non-wake-up words and the second posteriori probability of the static speech feature contained in the above speech frames and matched with the category of wake-up words may be outputted.

In particular implementations, the above-mentioned category of wake-up words may be further divided into two subcategories. In other words, the output of the speech wake-up model based on CNN may include three nodes. The three nodes include the category of non-wake-up words (i.e. the filler category) and two subcategories of wake-up words. The number of the categories included in the output of the speech wake-up model based on CNN is not limited in embodiments.

The waking up module 64 is configured to determine that a wake-up word is contained in the online recorded speech, when the second posteriori probability of the static speech feature contained in the at least one speech frame and matched with the category of wake-up words is greater than or equal to a preset threshold.

When the preset threshold is implemented, the preset threshold may be set according to system performances and/or practical requirements. The preset threshold is not limited in embodiments. For example, the above preset threshold may be set as 75%.

In the device for waking up via a speech based on AI, after the at least one speech frame is obtained via the framing module 61 by performing the windowing and framing operation on the online recorded speech, the feature extraction is performed via the extracting module 62 on the at least one speech frame to obtain the speech features. The calculation is performed via the calculating module 63 on the static speech feature contained in the at least one speech frame through the speech wake-up model based on convolutional neural network, to obtain the first posteriori probability of the static speech feature contained in the at least one speech frame and matched with the category of non-wake-up words and the second posteriori probability of the static speech feature contained in the at least one speech frame and matched with the category of wake-up words. When the second posteriori probability of the static speech feature contained in the at least one speech frame and matched with the category of wake-up words is greater than or equal to the preset threshold, it is determined via the waking up module 64 that the wake-up word is contained in the online recorded speech. There are less inputted features to the above speech wake-up model based on convolutional neural network, thereby achieving to reduce the computation amount. Furthermore, the device may further reduce the computation amount by employing a posteriori probability strategy. The device may better distinguish the wake-up word from the non-wake-up word, so as to improve the speech wake-up effect. Moreover, the device does not need to select a different non-wake-up word for each wake-up word, thereby improving a generality of the device.

Figure 7:
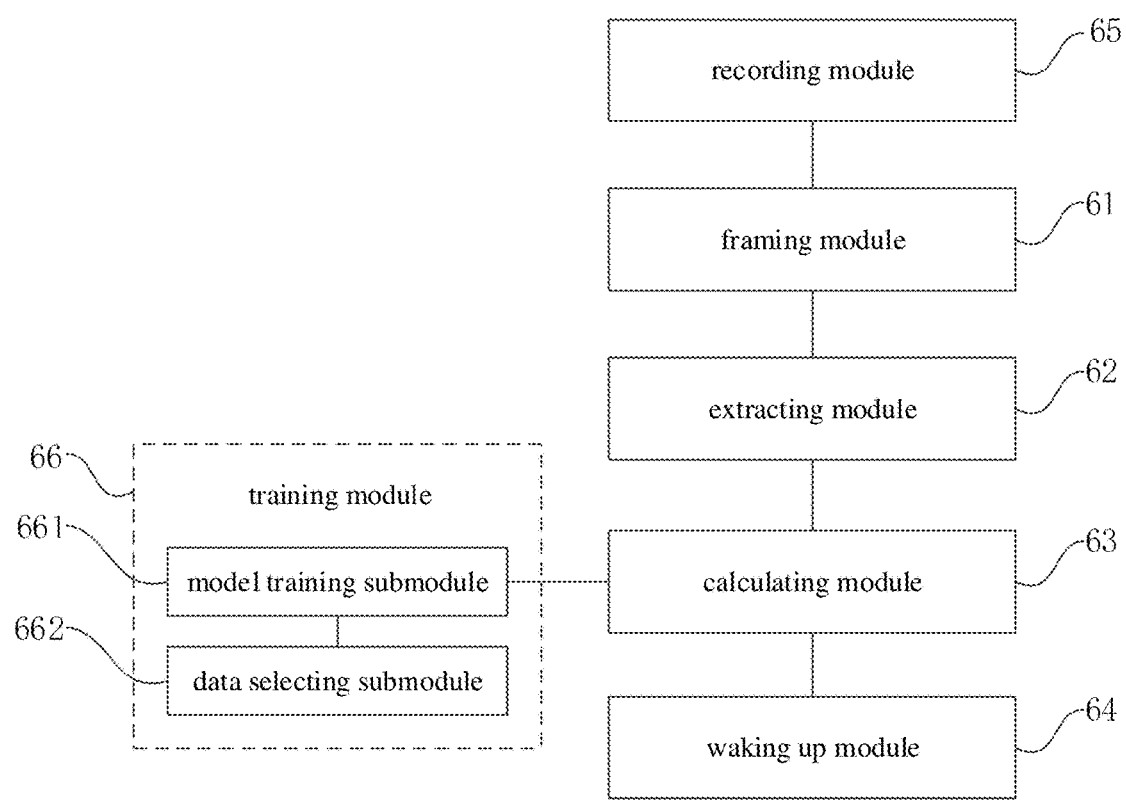
FIG. 7 is a block diagram illustrating a device for waking up via a speech based on AI according to another embodiment of the present disclosure.

FIG. 7 is a block diagram illustrating a device for waking up via a speech based on AI according to another embodiment of the present disclosure. Comparing to the device for waking up via a speech based on AI illustrated as FIG. 6, a difference between them is that the device for waking up via a speech based on AI in FIG. 7 may further include a recording module 65.

The recording module 65 is configured to record online a speech inputted by a user before the framing module 61 performs the windowing and framing operation on the online recorded speech, to obtain the at least one speech frame.

In embodiments, for a device having speech wake-up functions, the recording module 61 of the device keeps recording outside sounds online, such that the speech inputted by the user is recorded when the speech is inputted by the user, so as to trigger a subsequent progress.

Further, in embodiments, the calculating module 63 is further configured to accumulate the first posteriori probability of the static speech feature contained in a preset number of speech frames and matched with the category of non-wake-up words and to accumulate the second posteriori probability of the static speech feature contained in the preset number of speech frames and matched with the category of wake-up words, after the first posteriori probability and the second posteriori probability are obtained. Further, the calculating module 63 is further configured to obtain a third posteriori probability of the static speech frames contained in the preset number of speech frames and matched with the category of non-wake-up words, and to obtain a fourth posteriori probability of the static speech frames contained in the preset number of speech frames and matched with the category of wake-up words.

The second posteriori probability of the static speech feature contained in the at least one speech frame and matched with the category of wake-up words being greater than or equal to the preset threshold include the fourth posteriori probability of the static speech frames contained in the preset number of speech frames and matched with the category of wake-up words being greater than or equal to the preset threshold.

In other words, in embodiments, when the wake-up word is retrieved, a smooth strategy with a fixed window length is employed to accumulate, via the calculating module 63, the first posteriori probability of the static speech feature contained in the preset number of speech frames and matched with the category of non-wake-up words, and to accumulate, via the calculating module 63, the second posteriori probability of the static speech feature contained in the preset number of speech frames and matched with the category of wake-up words. When the fourth posteriori probability of the static speech frames contained in the preset number of speech frames and matched with the category of wake-up words is greater than or equal to the preset threshold, it is determined via the determining module 64 that the wake-up word is retrieved. That is, the wake-up word is contained in the online recorded speech.

The above preset number may be set according to system performances and/or practical requirements when being implemented, which is not limited in embodiments.

Further, the above device for waking up via a speech based on AI may also include a training module 66.

The training module 66 is configured to train an initiated model based on CNN according to a training criterion based on a CTC, to obtain the speech wake-up model based on the CNN, before the calculation is performed via the calculating module 63 on the static speech feature contained in the at least one speech frame through the speech wake-up model based on CNN.

In embodiments, the training criterion for training the CNN based model with six layers is changed from Cross Entropy to CTC. By training the initiated model based on CNN with six layers according to the training criterion based on CTC, the above-mentioned speech wake-up model based on CNN may be obtained.

In embodiments, the training module 66 may include a model training submodule 661 and a data selecting submodule 662.

The model training submodule 661 is configured to, by using training data, train the initiated model based on CNN according to the training criterion based on CUC, to obtain a seed model based on CNN.

The data selecting submodule 662 is configured to test the seed model based on CNN through test data, to obtain error test data falsely identified by the seed model based on CNN.

The model training submodule 661 is further configured to train again the seed model based on CNN using the error test data falsely identified until the seed model based on CNN is converged on a development set, to obtain the speech wake-up model based on CNN.

In detail, training, via the model training submodule 661, again the seed model based on CNN by using the error test data falsely identified may be represented as followings. The error test data falsely identified by the seed model based on CNN may be added to the training data. The seed model based on CNN may be trained again via the model training submodule 661 by using the training data including the error test data. The above procedures repeat until the seed model based on CNN is converged on the development set, so as to obtain the above-mentioned speech wake-up model based on CNN.

The above development set is a data set different either from the training data or from the test data. The above development set is used to monitor a wake-up performance of the seed model based on CNN trained, to obtain a final speech wake-up model based on CNN. The seed model based on CNN being converged on the development set means that the wake-up performance of the seed model based on CNN cannot increase on the development set.

In other words, after the seed model based on CNN is trained again by using the training data including the error test data falsely identified by the seed model based on CNN, the wake-up performance of the seed model based on CNN obtained in every training cycle is monitored on the development set. In general, the wake-up performance of the seed model based on CNN decreases on the development set firstly. After a plurality of training cycles, the wake-up performance of the seed model based on CNN may gradually increase on the development set, until the wake-up performance of the seed model based on CNN cannot increase on the development set. Then, it may be determined that the seed model based on CNN is converged on the development set and the seed model based on CNN acquired is the final speech wake-up model based on CNN.

With the device for waking up via a speech based on AI provided in embodiments of the present disclosure, by employing a CNN-CTC technical solution, the node number of an output lay of the speech wake-up model based on CNN may be greatly reduced, thereby efficiently reducing an amount of parameters of the speech wake-up model based on CNN and achieving to reduce a computation amount. By employing the smooth posteriori probability strategy, the computation amount may be further reduced. Furthermore, the category of non-wake-up words (i.e. the filler category) is used in the device provided in embodiments of the present disclosure, a training flexibility is improved, such that the device is very generally useable, and it does not need to select a different filler for each wake-up word. With the speech wake-up model based on CNN in the device provided in embodiments of the present disclosure, the speech wake-up effect may be improved better. Furthermore, the output layer of the speech wake-up model based on CNN is simple, and the speech wake-up model based on CNN has a clean target. Moreover, the speech wake-up model based on CNN has a good capacity of distinguishing the wake-up words from the non-wake-up words, which may further improve the speech wake-up effect.

Figure 8:
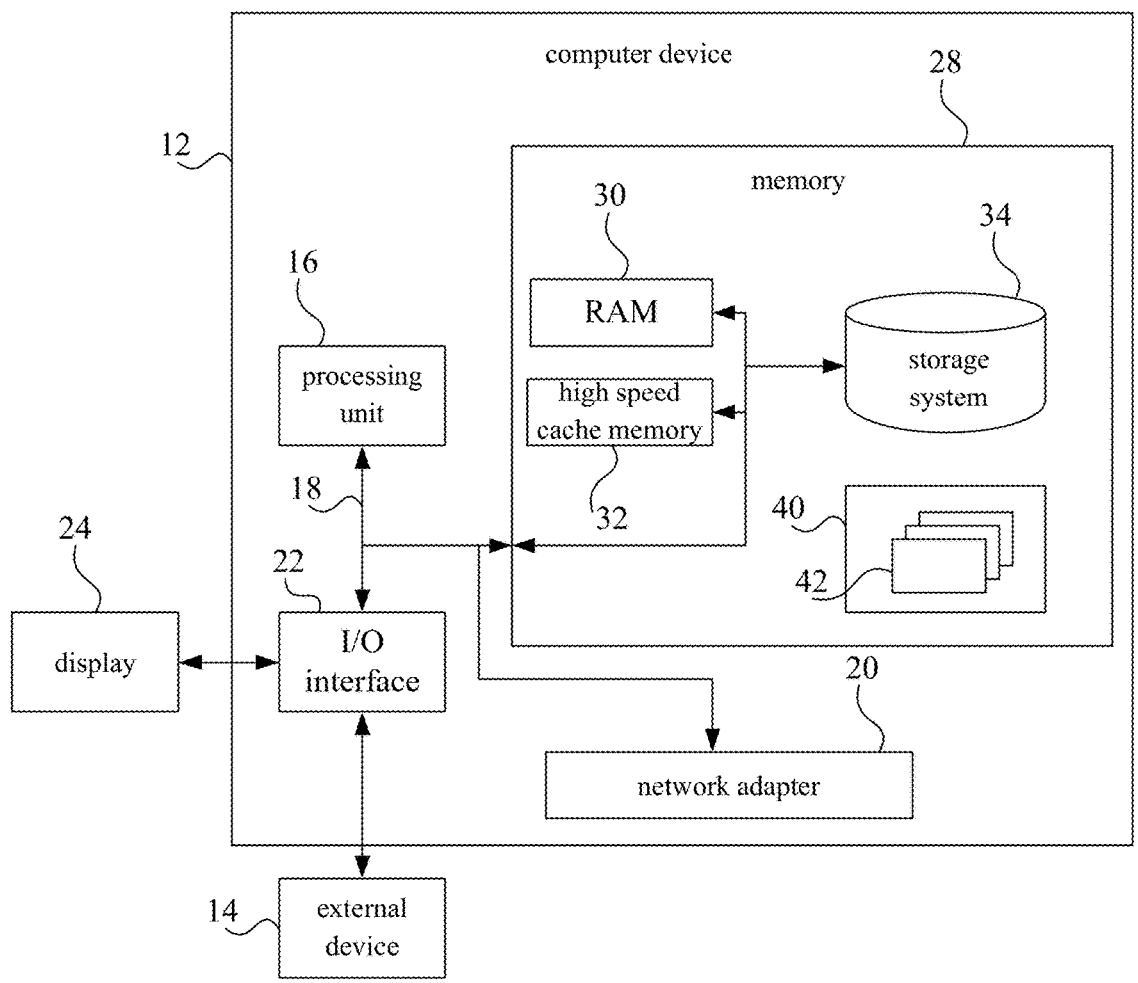
FIG. 8 is a block diagram illustrating a computer device according to an embodiment of the present disclosure.

FIG. 8 is a block diagram illustrating a computer device according to an embodiment of the present disclosure. The computer device in embodiments may be used as a device having speech wake-up functions for implementing the method for waking up via a speech based on AI provided in embodiments of the present disclosure.

The above device having the speech wake-up functions may be a smart phone, a tablet computer, a smart home appliance or the like. A form of the device having the speech wake-up functions is not limited in embodiments of the present disclosure.

As illustrated in FIG. 8, the above computer device may include: one or more processors; a storage device configured to store one or more programs. When the one or more programs are executed by the one or more processors, the method for waking up via a speech based on AI provided in embodiments of the present disclosure is executed by the one or more processors.

FIG. 8 illustrates a block diagram of an exemplary computer device 12 suitable for realizing implementations of the present disclosure. The computer device 12 illustrated in FIG. 8 is merely an example, which should be not understood to limit functions and usage scopes of embodiments of the present disclosure.

As illustrated in FIG. 8, the computer device 12 may be represented via a general computer device form. Components of the computer device 12 may include but be not limited to one or more processors or processing units 16, a system memory 28, a bus 18 connecting various system components including the system memory 28 and the processing units 16.

The bus 18 represents one or more of several types of bus structures, including a memory bus or a memory controller, a peripheral bus, a graphics acceleration port, a processor, or a local bus using any of a variety of bus structures. For example, these architectures include, but are not limited to, an Industry Standard Architecture (hereinafter referred to as ISA) bus, a Micro Channel Architecture (hereinafter referred to as MAC) bus, an enhanced ISA bus, a Video Electronics Standards Association (hereinafter referred to as VESA) local bus and Peripheral Component Interconnection (PCI) bus.

The computer device 12 typically includes a variety of computer system readable media. These media may be any available media accessible by the computer device 12 and includes both volatile and non-volatile media, removable and non-removable media.

The system memory 28 may include a computer system readable medium in the form of volatile memory, such as a random access memory (hereinafter referred to as RAM) 30 and/or a high speed cache memory 32. The computer device 12 may further include other removable or non-removable, volatile or non-volatile computer system storage media. By way of example only, the storage system 34 may be configured to read and write a non-removable and non-volatile magnetic media (not shown in FIG. 8, commonly referred to as a "hard drive"). Although not shown in FIG. 8, a magnetic disk driver for reading from and writing to a removable and non-volatile magnetic disk (such as "floppy disk") and a disk driver for a removable and non-volatile optical disk (such as compact disk read only memory (hereinafter referred to as CD-ROM), Digital Video Disc Read Only Memory (hereinafter referred to as DVD-ROM) or other optical media) may be provided. In these cases, each driver may be connected to the bus 18 via one or more data medium interfaces. The memory 28 may include at least one program product. The program product has a set (such as, at least one) of program modules configured to perform the functions of various embodiments of the present disclosure.

A program/utility 40 having a set (at least one) of the program modules 42 may be stored in, for example, the memory 28. The program modules 42 include but are not limited to, an operating system, one or more application programs, other programs modules, and program data. Each of these examples, or some combination thereof, may include an implementation of a network environment. The program modules 42 generally perform the functions and/or methods in the embodiments described herein.

The computer device 12 may also communicate with one or more external devices 14 (such as, a keyboard, a pointing device, a display 24, etc.). Furthermore, the computer device 12 may also communicate with one or more communication devices enabling a user to interact with the computer device 12 and/or other devices (such as a network card, modem, etc.) enabling the computer device 12 to communicate with one or more computer devices. This communication can be performed via the input/output (I/O) interface 22. Also, the computer device 12 may communicate with one or more networks (such as a local area network (hereafter referred to as LAN), a wide area network (hereafter referred to as WAN) and/or a public network such as an Internet) through a network adapter 20. As shown in FIG. 8, the network adapter 20 communicates with other modules of the computer device 12 over the bus 18. It should be understood that, although not shown in FIG. 8, other hardware and/or software modules may be used in connection with the computer device 12. The hardware and/or software includes, but is not limited to, microcode, device drivers, redundant processing units, external disk drive arrays, RAID systems, Drive and data backup storage system.

The processing unit 16 is configured to execute various functional applications and data processing by running programs stored in the system memory 28, for example, implementing the method for waking up via a speech based on AI provided in embodiments of the present disclosure.

Embodiments of the present disclosure further provide a computer readable medium stored computer programs. When the computer programs are executed by a processor, the method for waking up via a speech based on AI provided in embodiments of the present disclosure is executed.

The above storage medium including the computer executable instructions may adopt any combination of one or more computer readable media. The computer readable medium may be a computer readable signal medium or a computer readable storage medium. The computer readable storage medium may be, but is not limited to, for example, an electrical, magnetic, optical, electromagnetic, infrared, or semiconductor system, apparatus, device, component or any combination thereof. A specific example of the computer readable storage media include (a non-exhaustive list): an electrical connection having one or more wires, a portable computer disk, a hard disk, a random access memory (RAM), a read only memory (ROM), an Erasable Programmable Read Only Memory (EPROM) or a flash memory, an optical fiber, a compact disc read-only memory (CD-ROM), an optical memory component, a magnetic memory component, or any suitable combination thereof. In context, the computer readable storage medium may be any tangible medium including or storing programs. The programs may be used by an instruction executed system, apparatus or device, or a connection thereof.

The computer readable signal medium may include a data signal propagating in baseband or as part of a carrier which carries computer readable program codes. Such propagated data signal may be in many forms, including but not limited to an electromagnetic signal, an optical signal, or any suitable combination thereof. The computer readable signal medium may also be any computer readable medium other than the computer readable storage medium, which may send, propagate, or transport programs used by an instruction executed system, apparatus or device, or a connection thereof.

The program code stored on the computer readable medium may be transmitted using any appropriate medium, including but not limited to wireless, wireline, optical fiber cable, RF, or any suitable combination thereof.

The computer program code for carrying out operations of embodiments of the present disclosure may be written in one or more programming languages. The programming language includes an object oriented programming language, such as Java, Smalltalk, C++, as well as conventional procedural programming language, such as "C" language or similar programming language. The program code may be executed entirely on a user's computer, partly on the user's computer, as a separate software package, partly on the user's computer, partly on a remote computer, or entirely on the remote computer or server. In a case of the remote computer, the remote computer may be connected to the user's computer or an external computer (such as using an Internet service provider to connect over the Internet) through any kind of network, including a Local Area Network (hereafter referred as to LAN) or a Wide Area Network (hereafter referred as to WAN).

It should be illustrated that, in descriptions of the present disclosure, terms such as "first" and "second" are used herein for purposes of description and are not construed as indicating or implying relative importance or significance. Furthermore, in the description of the present disclosure, "a plurality of" means two or more than two, unless specified otherwise.

Any procedure or method described in the flow charts or described in any other way herein may be understood to comprise one or more modules, portions or parts for storing executable codes that realize particular logic functions or procedures. Moreover, advantageous embodiments of the present disclosure comprises other implementations in which the order of execution is different from that which is depicted or discussed, including executing functions in a substantially simultaneous manner or in an opposite order according to the related functions, which should be understood by those skilled in the art.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks or CD, etc.

In the description of the present disclosure, reference throughout this specification to "an embodiment," "some embodiments," "example," "a specific example," or "some examples," means that a particular feature, structure, material, or characteristic described in connection with the embodiment or example is included in at least one embodiment or example of the present disclosure. In the specification, the terms mentioned above are not necessarily referring to the same embodiment or example of the present disclosure. Furthermore, the particular features, structures, materials, or characteristics may be combined in any suitable manner in one or more embodiments or examples. Besides, any different embodiments and examples and any different characteristics of embodiments and examples may be combined by those skilled in the art without contradiction.

Although explanatory embodiments have been illustrated and described, it would be appreciated by those skilled in the art that the above embodiments are exemplary and cannot be construed to limit the present disclosure, and changes, modifications, alternatives and varieties can be made in the embodiments by those skilled in the art without departing from scope of the present disclosure.

What is claimed is:

1. A method for waking up via a speech based on artificial intelligence, performed by one or more computer devices and comprising:
performing a windowing and framing operation on an online recorded speech, to obtain at least one speech frame;
performing a feature extraction on the at least one speech frame, to obtain speech features;
performing a calculation on a static speech feature contained in the at least one speech frame through a speech wake-up model based on convolutional neural network, to obtain a first posteriori probability of the static speech feature contained in the at least one speech frame and matched with a category of non-wake-up words and a second posteriori probability of the static speech feature contained in the at least one speech frame and matched with a category of wake-up words; and
determining that a wake-up word is contained in the online recorded speech, when the second posteriori probability of the static speech feature contained in the at least one speech frame and matched with the category of wake-up words is greater than or equal to a preset threshold.

2. The method according to claim 1, wherein, before performing the windowing and framing operation on the online recorded speech, to obtain the at least one speech frame, the method further comprises:
recording online the speech inputted by a user.

3. The method according to claim 1, wherein the static speech feature contained in the at least one speech frame comprises: a static speech feature contained in a current speech frame, a static speech feature contained in a first number of speech frames ahead of the current speech frame, and a static speech feature contained in a second number of speech frames behind of the current speech frame.

4. The method according to claim 1, wherein after obtaining the first posteriori probability of the static speech feature contained in the at least one speech frame and matched with the category of non-wake-up words and the second posteriori probability of the static speech feature contained in the at least one speech frame and matched with the category of wake-up words, the method further comprises:
accumulating the first posteriori probability of the static speech feature contained in a preset number of speech frames and matched with the category of non-wake-up words, and accumulating the second posteriori probability of the static speech feature contained in the preset number of speech frames and matched with the category of wake-up words, obtaining a third posteriori probability of the static speech frames contained in the preset number of speech frames and matched with the category of non-wake-up words, and obtaining a fourth posteriori probability of the static speech frames contained in the preset number of speech frames and matched with the category of wake-up words; and
wherein the second posteriori probability of the static speech feature contained in the at least one speech frame and matched with the category of wake-up words being greater than or equal to the preset threshold comprises:
the fourth posteriori probability of the static speech frames contained in the preset number of speech frames and matched with the category of wake-up words is greater than or equal to the preset threshold.

5. The method according to claim 1, wherein before performing the calculation on the static speech feature contained in the at least one speech frame through the speech wake-up model based on convolutional neural network, the method further comprises:
training an initiated model based on convolutional neural network according to a training criterion based on connectionist temporal classifier, to obtain the speech wake-up model based on convolutional neural network.

6. The method according to claim 5, wherein training the initiated model based on convolutional neural network according to the training criterion based on connectionist temporal classifier, to obtain the speech wake-up model based on convolutional neural network comprises:
by using training data, training the initiated model based on convolutional neural network according to the training criterion based on connectionist temporal classifier, to obtain a seed model based on convolutional neural network;
testing the seed model based on convolutional neural network through test data, to obtain error test data falsely identified by the seed model based on convolutional neural network; and
training again the seed model based on convolutional neural network by using the error test data falsely identified until the seed model based on convolutional neural network is converged on a development set, to obtain the speech wake-up model based on convolutional neural network.

7. The method according to claim 2, wherein before performing the calculation on the static speech feature contained in the at least one speech frame through the speech wake-up model based on convolutional neural network, the method further comprises:
training an initiated model based on convolutional neural network according to a training criterion based on connectionist temporal classifier, to obtain the speech wake-up model based on convolutional neural network.

8. The method according to claim 3, wherein before performing the calculation on the static speech feature contained in the at least one speech frame through the speech wake-up model based on convolutional neural network, the method further comprises:
training an initiated model based on convolutional neural network according to a training criterion based on connectionist temporal classifier, to obtain the speech wake-up model based on convolutional neural network.

9. A computer device, comprising:
one or more processors;
a storage device, configured to store one or more programs;
wherein the one or more processors are configured to read the one or more programs from the storage device to execute acts of:
performing a windowing and framing operation on an online recorded speech, to obtain at least one speech frame;
performing a feature extraction on the at least one speech frame, to obtain speech features;
performing a calculation on a static speech feature contained in the at least one speech frame through a speech wake-up model based on convolutional neural network, to obtain a first posteriori probability of the static speech feature contained in the at least one speech frame and matched with a category of non-wake-up words and a second posteriori probability of the static speech feature contained in the at least one speech frame and matched with a category of wake-up words; and determining that a wake-up word is contained in the online recorded speech, when the second posteriori probability of the static speech feature contained in the at least one speech frame and matched with the category of wake-up words is greater than or equal to a preset threshold.

10. The computer device according to claim 9, wherein the one or more processors are further configured to execute an act of:

recording online the speech inputted by a user before performing the windowing and framing operation on the online recorded speech, to obtain the at least one speech frame.

11. The computer device according to claim 9, wherein the static speech feature contained in the at least one speech frame comprises: a static speech feature contained in a current speech frame, a static speech feature contained in a first number of speech frames ahead of the current speech frame, and a static speech feature contained in a second number of speech frames behind of the current speech frame.

12. The computer device according to claim 9, wherein the one or more processors are further configured to execute acts of:

accumulating the first posteriori probability of the static speech feature contained in a preset number of speech frames and matched with the category of non-wake-up words, and accumulating the second posteriori probability of the static speech feature contained in the preset number of speech frames and matched with the category of wake-up words, obtaining a third posteriori probability of the static speech frames contained in the preset number of speech frames and matched with the category of non-wake-up words, and obtaining a fourth posteriori probability of the static speech frames contained in the preset number of speech frames and matched with the category of wake-up words; and wherein the second posteriori probability of the static speech feature contained in the at least one speech frame and matched with the category of wake-up words being greater than or equal to the preset threshold comprises:

the fourth posteriori probability of the static speech frames contained in the preset number of speech frames and matched with the category of wake-up words is greater than or equal to the preset threshold.

13. The computer device according to claim 9, wherein the one or more processors are further configured to execute acts of:

training an initiated model based on convolutional neural network according to a training criterion based on connectionist temporal classifier, to obtain the speech wake-up model based on convolutional neural network.

14. The computer device according to claim 13, wherein training the initiated model based on convolutional neural network according to the training criterion based on connectionist temporal classifier, to obtain the speech wake-up model based on convolutional neural network comprises:

by using training data, training the initiated model based on convolutional neural network according to the training criterion based on connectionist temporal classifier, to obtain a seed model based on convolutional neural network;

testing the seed model based on convolutional neural network through test data, to obtain error test data falsely identified by the seed model based on convolutional neural network; and training again the seed model based on convolutional neural network by using the error test data falsely identified until the seed model based on convolutional neural network is converged on a development set, to obtain the speech wake-up model based on convolutional neural network.

15. A non-transitory computer readable medium stored computer programs thereon, wherein when the computer programs are executed by a processor, a method for waking up via a speech based on artificial intelligence is executed, and the method comprises:

performing a windowing and framing operation on an online recorded speech, to obtain at least one speech frame;

performing a feature extraction on the at least one speech frame, to obtain speech features;

performing a calculation on a static speech feature contained in the at least one speech frame through a speech wake-up model based on convolutional neural network, to obtain a first posteriori probability of the static speech feature contained in the at least one speech frame and matched with a category of non-wake-up words and a second posteriori probability of the static speech feature contained in the at least one speech frame and matched with a category of wake-up words; and determining that a wake-up word is contained in the online recorded speech, when the second posteriori probability of the static speech feature contained in the at least one speech frame and matched with the category of wake-up words is greater than or equal to a preset threshold.

16. The non-transitory computer readable medium according to claim 15, wherein, before performing the windowing and framing operation on the online recorded speech, to obtain the at least one speech frame, the method further comprises:

recording online the speech inputted by a user.

17. The non-transitory computer readable medium according to claim 15, wherein the static speech feature contained in the at least one speech frame comprises: a static speech feature contained in a current speech frame, a static speech feature contained in a first number of speech frames ahead of the current speech frame, and a static speech feature contained in a second number of speech frames behind of the current speech frame.

18. The non-transitory computer readable medium according to claim 15, wherein after obtaining the first posteriori probability of the static speech feature contained in the at least one speech frame and matched with the category of non-wake-up words and the second posteriori probability of the static speech feature contained in the at least one speech frame and matched with the category of wake-up words, the method further comprises:

accumulating the first posteriori probability of the static speech feature contained in a preset number of speech frames and matched with the category of non-wake-up words, and accumulating the second posteriori probability of the static speech feature contained in the preset number of speech frames and matched with the category of wake-up words, obtaining a third posteriori probability of the static speech frames contained in the preset number of speech frames and matched with the category of non-wake-up words, and obtaining a fourth posteriori probability of the static speech frames contained in the preset number of speech frames and matched with the category of wake-up words; and wherein the second posteriori probability of the static speech feature contained in the at least one speech frame and matched with the category of wake-up words being greater than or equal to the preset threshold comprises:

the fourth posteriori probability of the static speech frames contained in the preset number of speech frames and matched with the category of wake-up words is greater than or equal to the preset threshold.

19. The non-transitory computer readable medium according to claim 15, wherein before performing the calculation on the static speech feature contained in the at least one speech frame through the speech wake-up model based on convolutional neural network, the method further comprises:

training an initiated model based on convolutional neural network according to a training criterion based on connectionist temporal classifier, to obtain the speech wake-up model based on convolutional neural network.

20. The non-transitory computer readable medium according to claim 19, wherein training the initiated model based on convolutional neural network according to the training criterion based on connectionist temporal classifier, to obtain the speech wake-up model based on convolutional neural network comprises:

by using training data, training the initiated model based on convolutional neural network according to the training criterion based on connectionist temporal classifier, to obtain a seed model based on convolutional neural network;

testing the seed model based on convolutional neural network through test data, to obtain error test data falsely identified by the seed model based on convolutional neural network; and training again the seed model based on convolutional neural network by using the error test data falsely identified until the seed model based on convolutional neural network is converged on a development set, to obtain the speech wake-up model based on convolutional neural network.

* * * * *